(12) United States Patent
Tanizaki (10) Patent No.: US 10,686,727 B2
(45) Date of Patent: Jun. 16, 2020

(54) OPERATION DEVICE AND METHOD FOR MANAGING USE RIGHT OF COMMUNICATION CHANNEL

(71) Applicant: Tomoya Tanizaki, Tokyo (JP)

(72) Inventor: Tomoya Tanizaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 15/386,080

(22) Filed: Dec. 21, 2016

(65) Prior Publication Data

US 2017/0187645 A1 Jun. 29, 2017

(30) Foreign Application Priority Data

Dec. 24, 2015 (JP) ................................ 2015-252647

(51) Int. Cl.
*H04L 12/911* (2013.01)
*G06F 9/46* (2006.01)

(52) U.S. Cl.
CPC ............ *H04L 47/821* (2013.01); *G06F 9/468* (2013.01); *H04L 47/822* (2013.01); *H04L 47/826* (2013.01)

(58) Field of Classification Search
CPC .... H04L 47/821; H04L 47/822; H04L 47/826
USPC ......................................................... 709/226
See application file for complete search history.

(56) References Cited

U.S. PATENT DOCUMENTS

| 6,377,548 | B1* | 4/2002 | Chuah ..................... H04L 43/00 370/233 |
| 6,658,499 | B1* | 12/2003 | Day ...................... H04L 5/1446 710/8 |
| 2007/0118653 | A1* | 5/2007 | Bindal ..................... H04L 47/10 709/226 |
| 2011/0265102 | A1* | 10/2011 | Hanano .............. H04N 1/00241 719/328 |
| 2013/0067564 | A1 | 3/2013 | Chuen et al. | |
| 2013/0301547 | A1* | 11/2013 | Gupta ..................... H04W 4/90 370/329 |

FOREIGN PATENT DOCUMENTS

| JP | 2011-259214 | 12/2011 |
| JP | 2013-525871 | 6/2013 |

* cited by examiner

*Primary Examiner* — Benjamin M Thieu
*Assistant Examiner* — Leon Y Tseng
(74) *Attorney, Agent, or Firm* — Oblon, McClelland, Maier & Neustadt, L.L.P.

(57) ABSTRACT

An operation device is connected to a device main body through a communication channel to operate the device main body. The operation device includes a control module configured to control a use right of the communication channel used by an application. When a certain application performs communication through the communication channel, the control module determines whether the communication is available or not available based on a request for the use right to perform communication from the application, and notifies the application of a determination result to restrict the number of applications performing communication at the same time.

10 Claims, 9 Drawing Sheets

STATE 1

| USE QUOTA ID | USE STATE | USE APPLICATION PACKAGE NAME | COMMUNICATION AVAILABLE SPEED |
|---|---|---|---|
| 001 | NOT IN USE | | 3 MB/s |

STATE 2

| USE QUOTA ID | USE STATE | USE APPLICATION PACKAGE NAME | COMMUNICATION AVAILABLE SPEED |
|---|---|---|---|
| 001 | IN USE | com. test. testapp1 | 3 MB/s |

STATE 3

| USE QUOTA ID | USE STATE | USE APPLICATION PACKAGE NAME | COMMUNICATION AVAILABLE SPEED |
|---|---|---|---|
| 001 | IN USE | com. test. testapp1 | 1.5 MB/s |
| 002 | IN USE | com. test. testapp3 | 1.5 MB/s |

STATE 4

| USE QUOTA ID | USE STATE | USE APPLICATION PACKAGE NAME | COMMUNICATION AVAILABLE SPEED |
|---|---|---|---|
| 001 | IN USE | com. test. testapp1 | 1 MB/s |
| 002 | IN USE | com. test. testapp3 | 1 MB/s |
| 003 | IN USE | com. test. testapp2 | 1 MB/s |

STATE 1

| USE QUOTA ID | USE STATE | USE APPLICATION PACKAGE NAME | USE TYPE |
|---|---|---|---|
| 001 | NOT IN USE | | |
| 002 | NOT IN USE | | |

STATE 2

| USE QUOTA ID | USE STATE | USE APPLICATION PACKAGE NAME | USE TYPE |
|---|---|---|---|
| 001 | IN USE | com. test. testapp1 | FOREGROUND |
| 002 | NOT IN USE | | |

STATE 3

| USE QUOTA ID | USE STATE | USE APPLICATION PACKAGE NAME | USE TYPE |
|---|---|---|---|
| 001 | IN USE | com. test. testapp1 | FOREGROUND |
| 002 | IN USE | com. test. testapp2 | BACKGROUND |

FIG.7

STATE 1

| USE QUOTA ID | USE STATE | USE APPLICATION PACKAGE NAME | USE TYPE |
|---|---|---|---|
| 001 | NOT IN USE | | |

STATE 2

| USE QUOTA ID | USE STATE | USE APPLICATION PACKAGE NAME | USE TYPE |
|---|---|---|---|
| 001 | IN USE | com. test. testapp1 | FOREGROUND |

WHEN CPU USING RATE IS MONITORED AND THERE IS MARGIN

STATE 3

| USE QUOTA ID | USE STATE | USE APPLICATION PACKAGE NAME | USE TYPE |
|---|---|---|---|
| 001 | IN USE | com. test. testapp1 | FOREGROUND |
| 002 | IN USE | com. test. testapp2 | BACKGROUND |

FIG.8

STATE 1

| USE QUOTA ID | USE STATE | USE APPLICATION PACKAGE NAME | COMMUNICATION AVAILABLE SPEED |
|---|---|---|---|
| 001 | NOT IN USE |  | 3 MB/s |

STATE 2

| USE QUOTA ID | USE STATE | USE APPLICATION PACKAGE NAME | COMMUNICATION AVAILABLE SPEED |
|---|---|---|---|
| 001 | IN USE | com. test. testapp1 | 3 MB/s |

STATE 3

| USE QUOTA ID | USE STATE | USE APPLICATION PACKAGE NAME | COMMUNICATION AVAILABLE SPEED |
|---|---|---|---|
| 001 | IN USE | com. test. testapp1 | 1.5 MB/s |
| 002 | IN USE | com. test. testapp3 | 1.5 MB/s |

STATE 4

| USE QUOTA ID | USE STATE | USE APPLICATION PACKAGE NAME | COMMUNICATION AVAILABLE SPEED |
|---|---|---|---|
| 001 | IN USE | com. test. testapp1 | 1 MB/s |
| 002 | IN USE | com. test. testapp3 | 1 MB/s |
| 003 | IN USE | com. test. testapp2 | 1 MB/s |

FIG.9

BROWSER APPLICATION IS BEING DISPLAYED

HOME SCREEN BEING DISPLAYED

OPERATION DEVICE AND METHOD FOR MANAGING USE RIGHT OF COMMUNICATION CHANNEL

CROSS-REFERENCE TO RELATED APPLICATIONS

The present application claims priority under 35 U.S.C. § 119 to Japanese Patent Application No. 2015-252647, filed Dec. 24, 2015. The contents of which are incorporated herein by reference in their entirety.

BACKGROUND OF THE INVENTION

1. Field of the Invention

The present invention relates to an operation device and a method for managing a use right of a communication channel.

2. Description of the Related Art

There is already known a technique of utilizing, with an operation device, resources and functions of different main bodies connected through universal serial buses (USBs) in communication over the USBs, the resources including a hard disc drive (HDD) and other devices, the functions being invoked through application programming interfaces (APIs). However, in the communication with the device main body using a conventional operation device, the communication through the USBs increases a central processing unit (CPU) using rate, which has influence on device processing and can cause abnormalities in the operation of the device in the worst case.

Japanese Translation of PCT International Application Publication No. JP-T-2013-525871 cited as a conventional technique describes an access right management system having a right adjustment module in which a mobile communication device corrects an access right to company data stored in a company server locally, depending on whether the mobile communication device is connected to the company server. However, the access right management system aims at, through a flexible method, allowing a mobile communication device to access data owned by a company while maintaining data security and data integrity, and the use of communication through the USBs increases a CPU using rate and then has influence on system processing. Thus, the above-described problem has not been solved.

SUMMARY OF THE INVENTION

According to one aspect of the present invention, there is provided an operation device connected to a device main body through a communication channel to operate the device main body, the operation device including a control module configured to control a use right of the communication channel used by an application, wherein when a certain application performs communication through the communication channel, the control module determines whether the communication is available or not available based on a request for the use right to perform communication from the application, and notifies the application of a determination result to restrict the number of applications performing communication at the same time.

According to another aspect of the present invention, there is provided a method for managing a use right of a communication channel performed by an operation device connected to a device main body through the communication channel, the method including: controlling, by a control module of the operation device, the use right of the communication channel used by an application; and when a certain application performs communication through the communication channel, determining, by the control module, whether the communication is available or not available based on a request for the use right to perform communication from the application, and notifying the application of a determination result to restrict the number of applications performing communication at the same time.

According to still another aspect of the present invention, there is provided an operation device connected to a device main body through a communication channel to operate the device main body, the operation device including: a processor; and a memory configured to store code executable by the processor, the code including: code configured to control a use right of the communication channel used by an application; and when a certain application performs communication through the communication channel, code configured to determine whether the communication is available or not available based on a request for the use right to perform communication from the application, and to notify the application of a determination result to restrict the number of applications performing communication at the same time.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention has an object to provide an operation device and a method for managing a use right of a communication channel capable of suppressing a CPU using rate and preventing influence on operation of a device main body when an application installed on the operation device performs communication with the device main body using a communication channel.

Next, the characteristics of the present invention will be described before explanation of an embodiment of the present invention. That is, in communication between a device main body and an operation device through a USB as a communication channel, for example, a control module of the operation device of the present invention gives an application a right to perform communication, in particular, large capacity communication (the communication allowing a certain unit amount or more of information to be transmitted at the same time is referred to here as large capacity communication or high-speed main body communication), through the USB. That is, the present invention has the feature that the operation device controls communication and restricts the number of applications performing large capacity communication or high-speed main body communication at the same time. The following will describe the embodiment of the operation device of the present invention with reference to the enclosed drawings.

Figure 1:
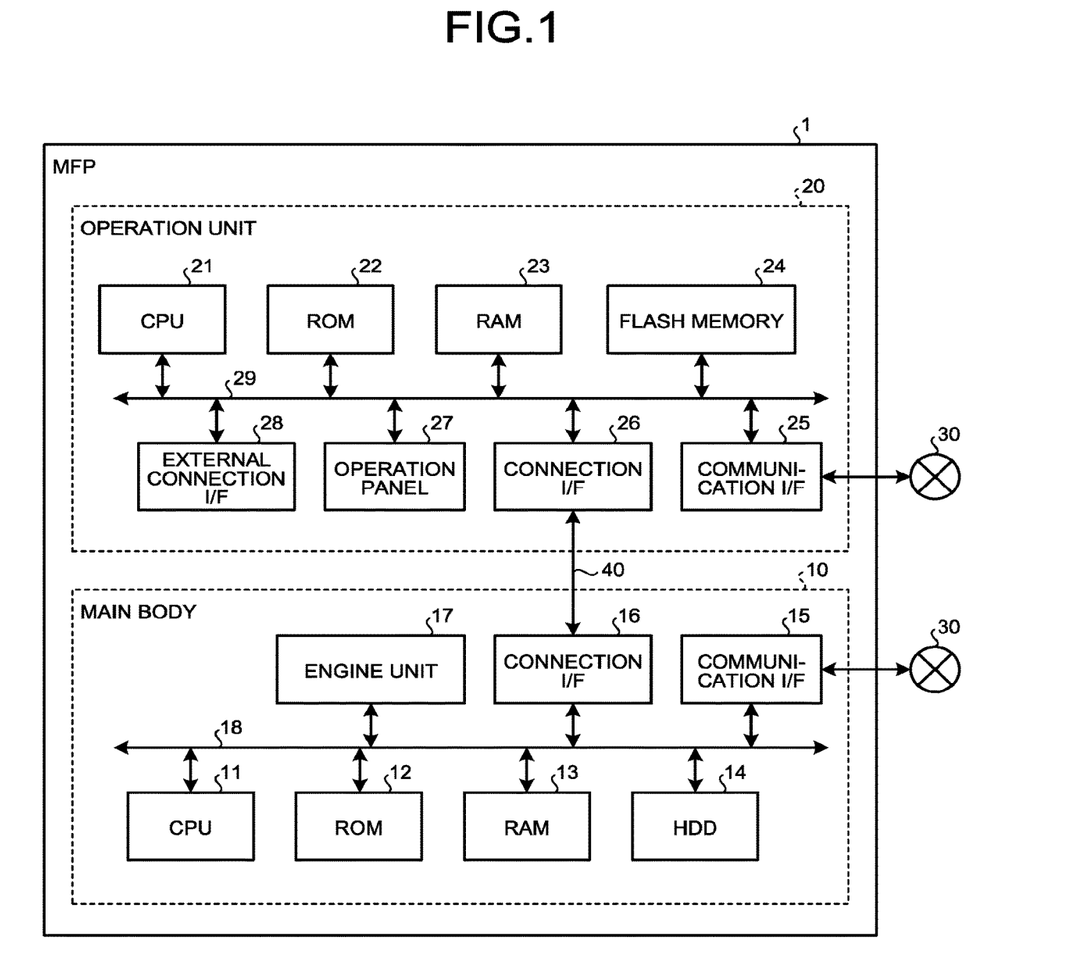
FIG. 1 is a block diagram illustrating an example of a hardware configuration of an operation unit and a main body device, the operation unit being an embodiment of an operation device of the present invention, the main body device (multifunction peripheral (MFP) here) performing communication with the operation unit.

FIG. 1 is a block diagram illustrating an example of a hardware configuration of an operation unit and a main body device, the operation unit being an embodiment of an operation device according to the present invention, the main body device (multifunction peripheral (MFP) here) performing communication with the operation unit. As illustrated in FIG. 1, an MFP 1 includes an MFP main body 10 that can implement various functions such as a copying function, a scanner function, a facsimile function, and a printer function, and an operation unit 20 that receives input in accordance with user operation. The MFP main body 10 and the operation unit 20 are connected to each other to be communicable through a dedicated communication channel 40. Note that the communication channel 40 conforming to the universal serial bus (USB) standard is used here. Note that the communication channel 40 may conform to an arbitrary standard irrespective of whether it is wired or wireless.

The operation unit 20 is an operation (or general-purpose operation) device. The MFP main body 10 can act in accordance with operation received by the operation unit 20. The MFP main body 10 can also perform communication with an external device such as a client personal computer (PC), and can act in accordance with an instruction received from the external device.

Next, a hardware configuration of the MFP main body 10 will be described. As illustrated in FIG. 1, the MFP main body 10 includes a central processing unit (CPU) 11, a read only memory (ROM) 12, a random access memory (RAM) 13, a hard disc drive (HDD) 14, a communication interface (I/F) 15, a connection I/F 16, and an engine unit 17. These are connected to one another through a system bus 18.

The CPU 11 integrally controls the operation of the MFP main body 10. That is, the CPU 11 executes programs stored in the ROM 12, the HDD 14, or the like using the RAM 13 as a work area, to control the entire operation of the MFP main body 10 and implement the above-described various functions such as a copying function, a scanner function, a facsimile function, and a printer function.

The communication I/F 15 is an interface for connection with a network 30. The connection I/F 16 is an interface for connection with the operation unit 20 through the communication channel 40. The engine unit 17 is hardware that performs processing to implement the copying function, the scanner function, the facsimile function, and the printer function, but does not perform general-purpose information processing or communication processing. For example, the engine unit 17 includes a scanner (image reading unit) for scanning and reading out document images, a printer (image formation unit) for printing on sheet materials such as a paper sheet, and a facsimile unit for facsimile communication. Furthermore, the engine unit 17 can include a specific option such as a finisher for sorting printed sheet materials or an automatic document feeder (ADF) for automatically feeding documents.

Next, a hardware configuration of the operation unit 20 will be described. The operation unit 20 includes a CPU 21, a ROM 22, a RAM 23, a flash memory 24, a communication I/F 25, a connection I/F 26, an operation panel 27, and an external connection I/F 28. They are connected to one another through a system bus 29. A user can operate the operation unit 20 directly to utilize the functions of the MFP main body 10 using an application.

The CPU 21 integrally controls the operation of the operation unit 20. That is, the CPU 21 includes a CPU control unit 201, a control module 202, a communication control unit 203, and the like, which are described later, to control the operation of the operation unit 20 and serve as function implementation means implemented by programs stored in the ROM 22 or the flash memory 24 using the RAM 23 as a work area. Moreover, the CPU 21 performs various functions such as display of information (images) in accordance with input from a user.

The communication I/F 25 is an interface for connection with the network 30. The connection I/F 26 is an interface for communication with the MFP main body 10 through the communication channel 40. The operation unit 20 includes the operation panel 27, and the operation panel 27 is provided with a touch screen (display operation unit), a keyboard, and the like. The operation unit 20 performs communication with the MFP main body 10 through the connection I/F 26 (communication IF (USB)).

Figure 2:
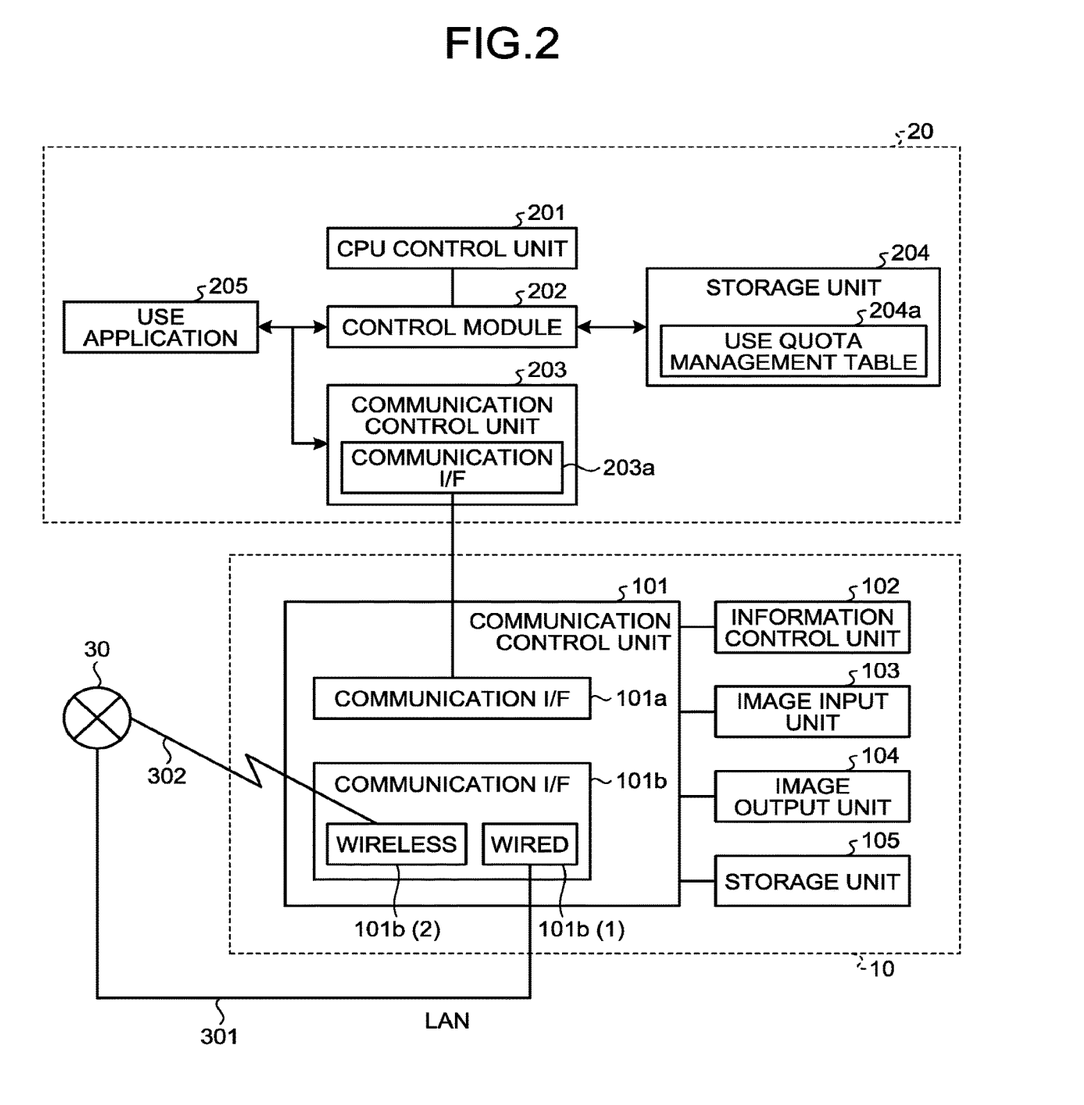
FIG. 2 is a functional block diagram of an image processing device illustrated in FIG. 1.

FIG. 2 is a functional block diagram for performing access right management in the MFP 1 described above. A use application 205 (application program that is read out by a computer including the CPU 21, the ROM 22, and the RAM 23 to provide a function of an user interface (UI) in the operation panel 27 for operation or display of functions of the MFP main body 10) uses functions of the MFP main body 10 through the communication control unit 203. Moreover, when such functions are used, the use application 205 obtains a right (referred to here as a use right) to perform large capacity communication (or high-speed main body communication) from the control module 202. Note that the communication between the use application 205 and the MFP main body 10 is performed directly through the communication control unit 203, not through the control module 202.

The communication control unit 203 controls communication between the operation device 20 and the MFP main body 10 through a communication IF (USB) 203a. The CPU control unit 201 provides the control module 202 with information on a CPU using rate of the CPU 21. Here, a storage unit 204 includes the ROM 22, the RAM 23, and the flash memory 24, which are memory areas of the operation unit 20, and the flash memory 24 stores a use quota management table 204a, for example. The communication control unit 101 controls communication between the operation unit (operation device) 20 and the MFP main body 10 through a communication IF (USB) 101a. In addition, the communication control unit 101 includes a communication IF (wired LAN) 101b(1) and a communication IF (wireless LAN) 101b(2). Here, the RAM forming a storage unit 105 is a memory area of the MFP main body 10, and the HDD is a nonvolatile area of the MFP main body 10.

An information control unit 102 manages resources of the MFP main body 10, and holds a functional algorithm. An image input unit 103 has a function of reading out images in the MFP main body 10. An image output unit 104 has a function of outputting images in the MFP main body 10. The information control unit 102 is a function implementation means implemented by executing programs in the CPU 11. Moreover, the image input unit 103 and the image output unit 104 are function implementation means implemented by executing programs in the CPU 11 and also functional units implemented by the engine unit 17. A local area network (LAN) 301 is a wired network (wired LAN) for transmitting and receiving information through the communication IF 101a of the communication control unit 101 of the MFP main body 10. A wireless network 302 is a wireless network (wireless LAN) for transmitting and receiving information through the communication IF 101b of the communication control unit of the MFP main body 10.

Figure 3:
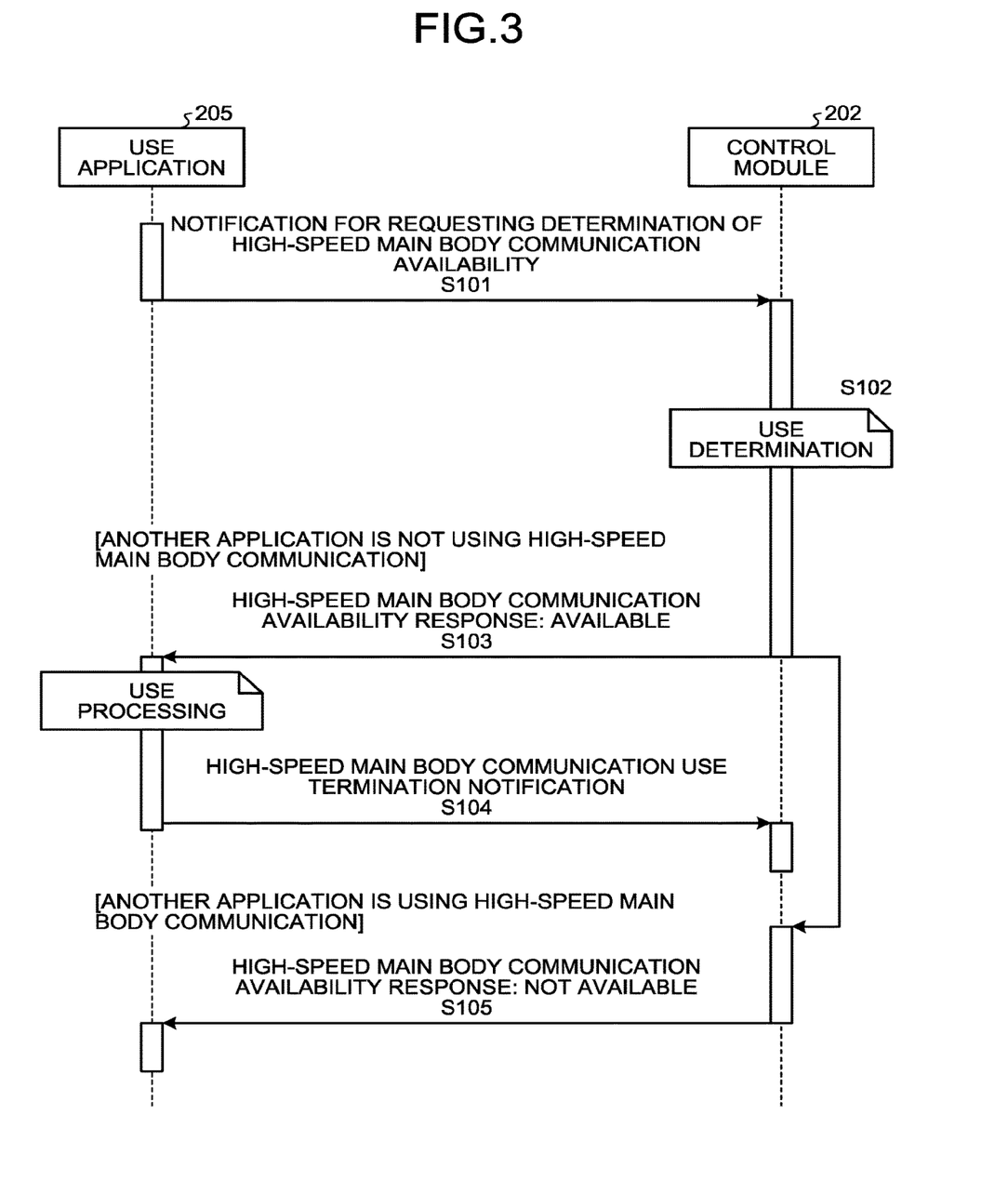
FIG. 3 is a flow diagram illustrating procedures of processing performed between a use application and a control module to obtain a use right of high-speed main body communication.

FIG. 3 is a flow diagram illustrating procedures of processing performed between the use application 205 and the control module 202 to obtain a use right of high-speed main body communication. In FIG. 3, the use application 205 configured to use high-speed (or large capacity) communication with the MFP main body 10 first transmits, before using the communication, a notification for requesting determination of high-speed main body communication availability to the control module 202 (S101). Having received the notification for requesting determination of high-speed main body communication availability from the use application 205, the control module 202 determines whether another application is already using high-speed main body communication by confirming a use state (in use or not in use) using the use quota management table 204a and, if the high-speed main body communication is in use, a use application package name and a use type (foreground or background) (S102). As a result of the determination, when it is determined that another application is not using high-speed main body communication, the control module 202 notifies the use application 205 of "available" and a communication available speed in a high-speed main body communication availability response (S103).

Only when the high-speed main body communication availability response indicates "available", the use application 205 can use high-speed communication with the MFP main body 10 at a speed equal to or lower than the communication available speed, and performs use processing. Once the use processing is finished, the use application 205 transmits a high-speed main body communication use termination notification to the control module 202 (S104). Having received the high-speed main body communication use termination notification from the use application 205, the control module 202 updates the use quota management table 204a. Having received the notification for requesting determination of high-speed main body communication availability from the use application 205 (S101), the control module 202 determines whether another application is already using high-speed main body communication by confirmation using the use quota management table 204a (S102). When it is determined that another application is already using high-speed main body communication, the control module 202 notifies the use application 205 of "not available" in a high-speed main body communication availability response (S105). When the high-speed main body communication availability response indicates "not available", the use application 205 cannot use high-speed communication with the MFP main body 10.

Figure 4:
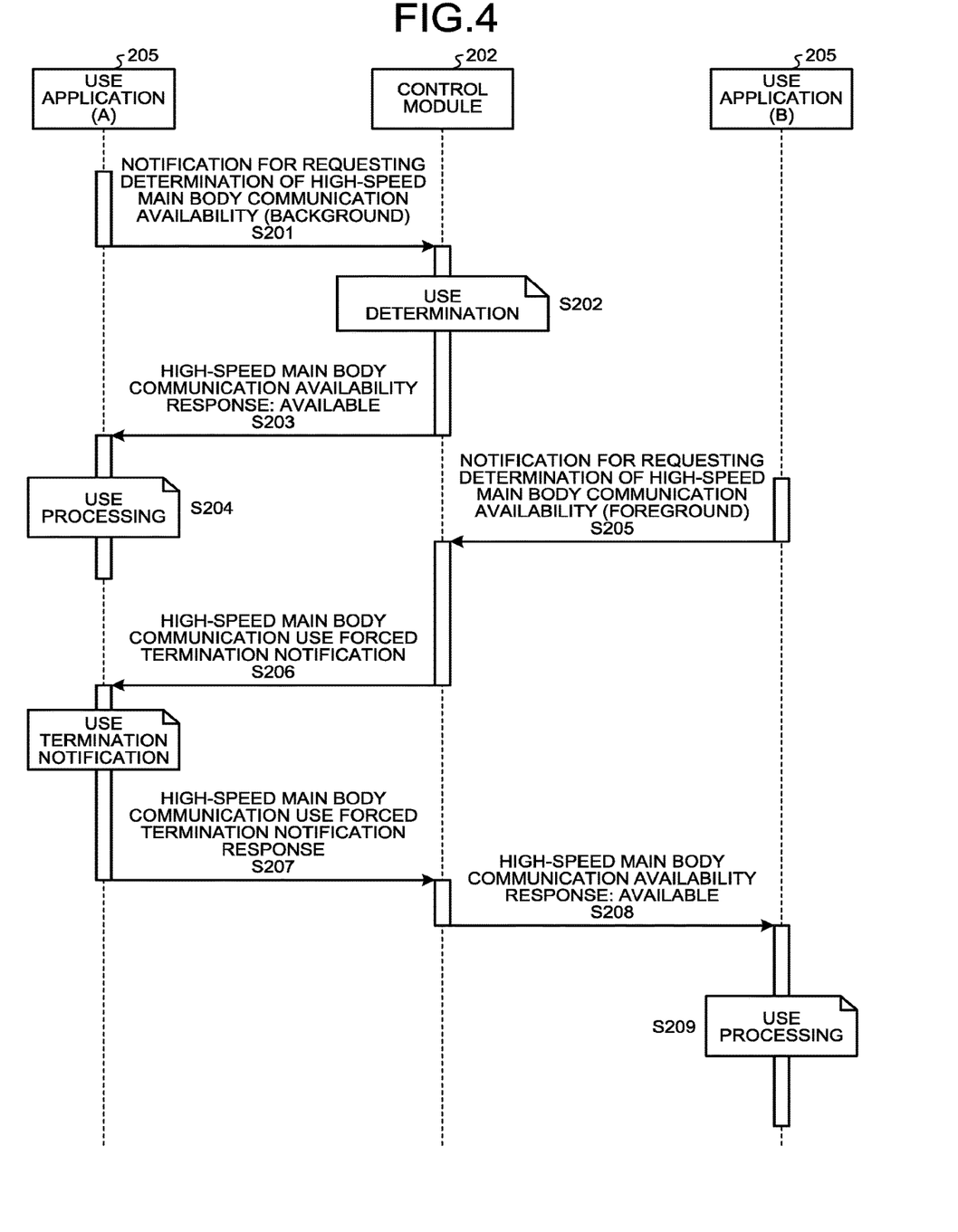
FIG. 4 is a flow diagram explaining procedures of interruption by an application of higher priority use type among a plurality of applications.

FIG. 4 is a flow diagram explaining interruption by an application of higher priority use type among a plurality of use applications 205. The use application (A) 205 to use high-speed communication with the MFP main body 10 transmits, before using the communication, a notification for requesting determination of high-speed main body communication availability (use type: background) to the control module 202 (S201). Here, the use type is a parameter indicating the priority, and the embodiment has two types of foreground=high priority and background=low priority. Note that the use type can be also represented as level 1, level 2, level 3 . . . , for example.

Having received the notification for requesting determination of high-speed main body communication availability from the use application (A) 205 (S202), the control module 202 refers to the use quota management table 204a, and notifies the use application (A) 205 of "available" and a communication available speed in a high-speed main body communication availability response when another application is not using high-speed main body communication.

Only when the high-speed main body communication availability response indicates "available" (S203), the use application (A) 205 can use high-speed communication with the MFP main body 10 at a speed equal to or lower than the communication available speed, and performs use processing (S204). Here, a use application (B) 205 transmits a notification for requesting determination of high-speed main body communication availability (use type: foreground) to the control module 202 while the use application (A) 205 is performing use processing (S205). Having received the notification for requesting determination of high-speed main body communication availability, the control module 202 refers to the use quota management table 204a, and transmits a notification of a high-speed main body communication use forced termination to the use application (A) 205 when it is determined that high-speed main body communication is being used by the use application (A) 205 the use type of which is a lower priority than that of the use application (B) 205 (S206).

Having received the notification of the high-speed main body communication use forced termination, the use application (A) 205 performs processing of terminating the use of high-speed main body communication, and transmits a high-speed main body communication use forced termination notification response (S207). Having received the high-speed main body communication use forced termination notification response, the control module 202 updates the use quota management table 204a, and notifies the use application (B) 205 of "available" and a communication available speed in a high-speed main body communication availability response (S208). Only when the high-speed main body communication availability response indicates "available", that is, under such a condition, the use application (B) 205 can use high-speed communication with the MFP main body 10 at a speed equal to or lower than the communication available speed, and performs use processing (S209). In the embodiment, the application can set the use priority with the permission of the control module 202, and important use for the entire device (or system) can be processed preferentially.

Figure 5:
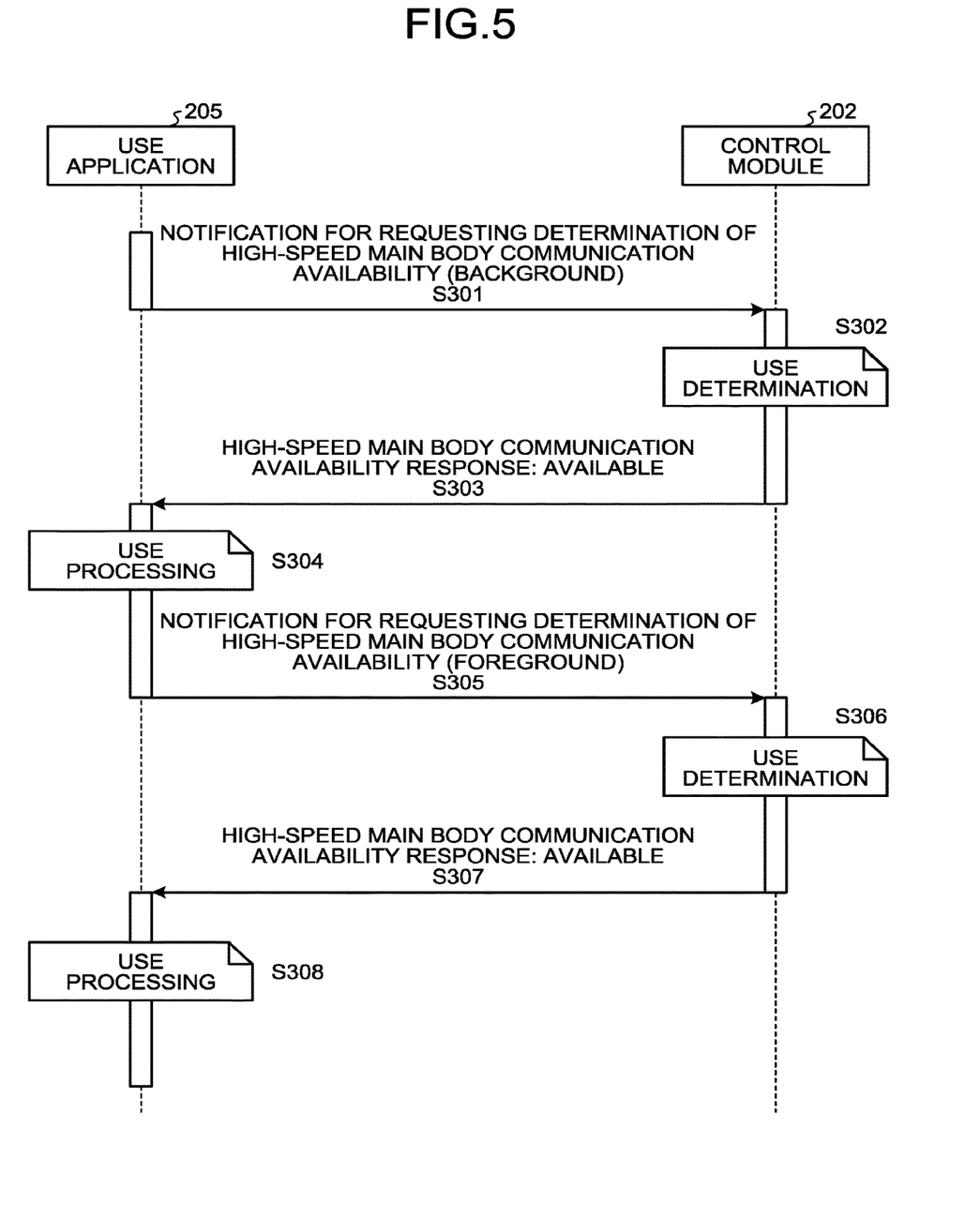
FIG. 5 is a flow diagram illustrating procedures for use type switching processing of a use application.

FIG. 5 is a flow diagram illustrating procedures for use type switching processing of the use application 205. The use application 205 transmits, before using the communication, a notification for requesting determination of high-speed main body communication availability (use type: background) to the control module 202 (S301). Having received the notification for requesting determination of high-speed main body communication availability, the control module 202 performs use determination by referring to the use quota management table 204*a* (S302), and notifies the use application 205 of "available" and a communication available speed in a high-speed main body communication availability response when another use application 205 is not using high-speed main body communication (S303). Only when the high-speed main body communication availability response indicates "available", the use application 205 can use high-speed communication with the MFP main body 10 at a speed equal to or lower than the communication available speed, and performs use processing (S304).

In order to raise the use priority during use processing, the use application 205 transmits a notification for requesting determination of high-speed main body communication availability with a changed use type (use type: foreground) to the control module 202 (S305). The control module 202 performs use determination (S306), updates the use quota management table 204*a*, and notifies the use application 205 of "available" and a communication available speed in a high-speed main body communication availability response (S307). The use application 205 performs use processing of communication with higher priority after the change of the use type, continuously from before the change (S308). Therefore, in the embodiment, when the use application 205 changes the priority, it is not necessary to release a use right once and obtain it again with the new priority.

Figure 6:
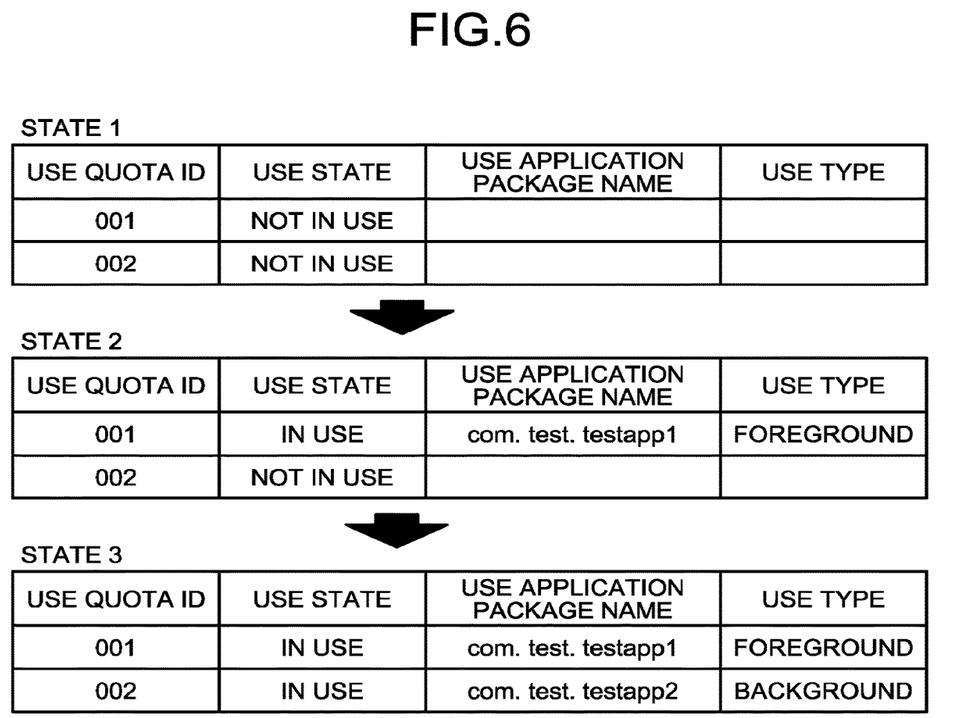
FIG. 6 is a diagram illustrating contents of a use quota management table (with a fixed number of use quota IDs)

FIG. 6 is a diagram illustrating contents of the use quota management table 204*a*. The package name of each application is as follows.

Use application (1) 205: com.test.testapp1
Use application (2) 205: com.test.testapp2

The use state of each application (state 1 to state 3) is managed in the use quota management table 204*a* held by the control module 202. The number of use quota IDs is preliminarily determined depending on the performance of the CPU 21 of the access right management system or other properties.

With two use quota IDs ("001", "002"), in the state 1, when the control module 202 has received a notification for requesting determination of high-speed main body communication availability (use type: foreground) from the use application (1) 205 (("not in use") for both use quotas), the control module 202 updates a record of the use quota ID 001. The state 2 indicates a result of this update. That is, the control module 202 notifies (replies to) the use application (1) 205 of "available" in a high-speed main body communication availability response, and sets a package name of the use application (1) 205 (com.test.testapp1) to the use application package name, and "foreground" to the use type, which shifts the use state to the state 2 (use quota ID "001" is in use, and use quota ID "002" is not in use).

In the state 2, having received the notification for requesting determination of high-speed main body communication availability (use type: background) from the use application (2) 205, the control module 202 updates a record of the use quota ID "002" in the use quota management table 204*a*. The control module 202 notifies (replies to) the use application (2) 205 of "available" in a high-speed main body communication availability response, and sets a package name of the use application (2) 205 (com.test.testapp2) to the use application package name, and "background" to the use type, which shifts the use state to the state 3 (both use quota ID "001" and use quota ID "002" are in use). In the embodiment, the maximum number of applications using high-speed communication can be set depending on CPU performance, so that the resources can be utilized to the maximum.

Figure 7:
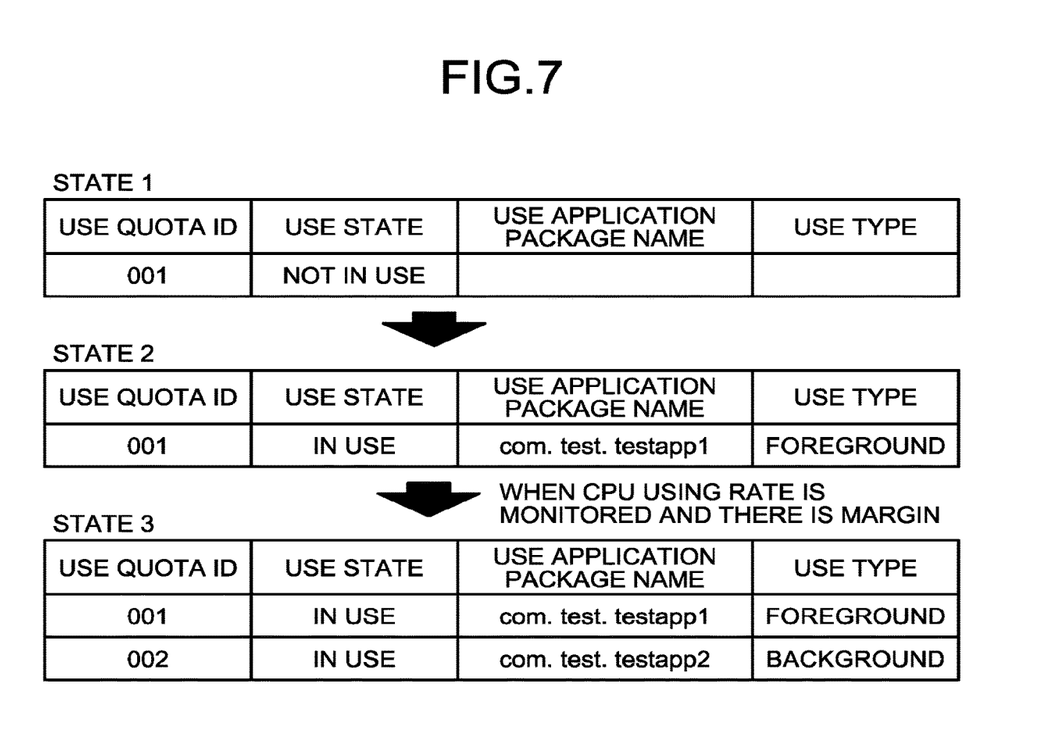
FIG. 7 is a diagram illustrating contents of a use quota management table (with a variable number of use quota IDs)

FIG. 7 is a diagram illustrating contents of the use quota management table 204*a*. In this example, the number of use quota IDs is variable. The package name of each application is as follows.

Use application (1) 205: com.test.testapp1
Use application (2) 205: com.test.testapp2

The use state of each application is managed in the use quota management table 204*a* held by the control module 202. The number of use quota IDs increases depending on the state of a CPU using rate obtained by the control module 202 from the CPU control unit 201, and decreases when the use of an application is finished. That is, in this example, the number of use applications is dynamically changed with the state of a CPU using rate obtained from the CPU control unit 201.

In the use state 1, having received the notification for requesting determination of high-speed main body communication availability (use type: foreground) from the use application (1) 205, the control module 202 updates a record of the use quota ID "001" in the use quota management table 204*a*. The control module 202 notifies (replies to) the use application (1) 205 of "available" in a high-speed main body communication availability response, and sets a package name of the use application (1) 205 to the use application package name, and "foreground" to the use type. This shifts the use state to the state 2.

Next, having received a notification for requesting determination of high-speed main body communication availability (use type: background) from the use application (2) 205, the control module 202 monitors a CPU using rate provided by the CPU control unit 101, and updates a record of the use quota ID "002" when there is a margin in CPU using rate. The control module 202 notifies (replies to) the use application (2) 205 of "available" in a high-speed main body communication availability response, and sets a package name of the use application (2) 205 (com.test.testapp2) to the use application package name, and "background" to the use type. This shifts the use state to the state 3. In this embodiment, the CPU control unit 101 monitors a using rate of the CPU, and can set the maximum number of applications using high-speed communication. Thus, the resources can be utilized to the maximum.

Figure 8:
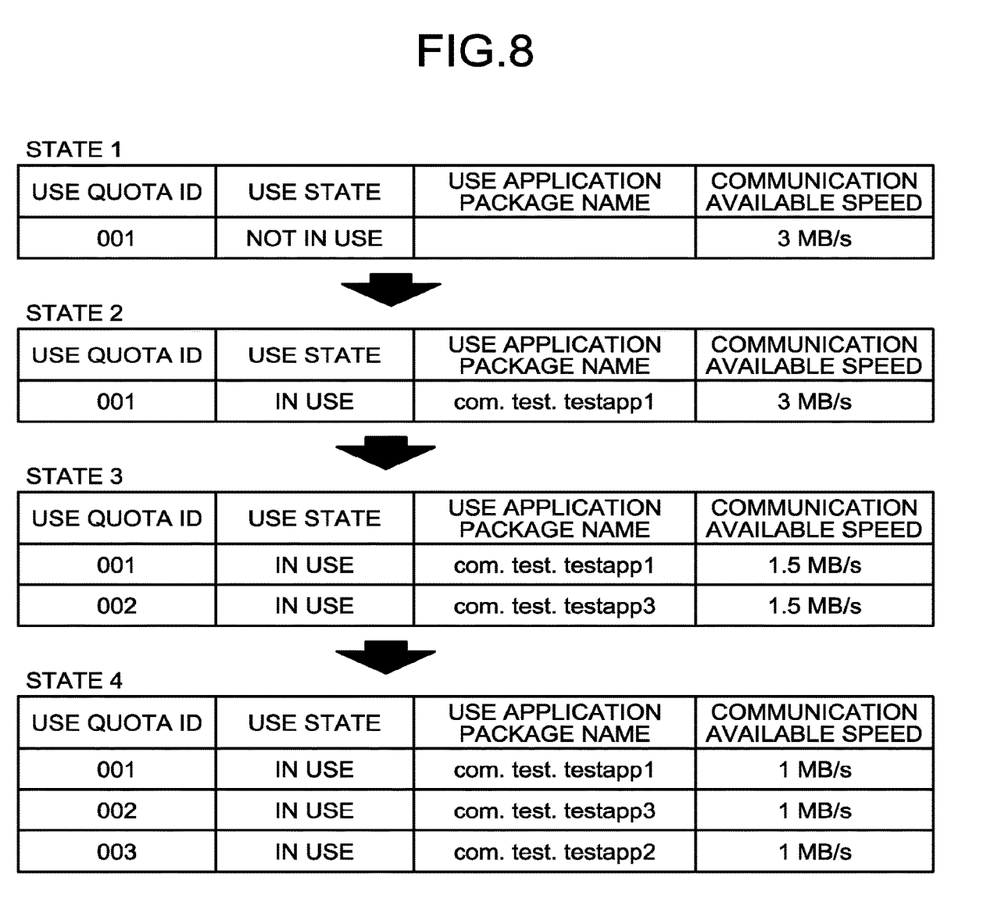
FIG. 8 is a diagram illustrating contents of a use quota management table (with a variable communication available speed)

FIG. 8 is a diagram illustrating contents of the use quota management table 204*a* (with a variable communication available speed).

Use application (1) 205: com.test.testapp1
Use application (2) 205: com.test.testapp2
Use application (3) 205: com.test.testapp3

The use state (state 1 to state 4) of each application is managed at the use quota management table 204*a* held by the control module 202. Also in this example, the number of use quota IDs varies with a use state. When the total maximum value of a communication available speed is 3 MB/S, in the state 1, having received the notification for requesting determination of high-speed main body communication availability from the use application (1) 205, the control module 202 updates a record of the use quota ID "001". The control module 202 notifies (replies to) the use application (1) 205 of "available" and a communication available speed 3 MB/S in a high-speed main body communication availability response, and sets a package name of the use application (1) 205 to the use application package name. This shifts the use state to the state 2.

Next, in the state 2, having received the notification for requesting determination of high-speed main body communication availability from the use application (3) 205, the control module 202 adds a record as a new use quota ID to the use quota management table 204*a*. When the number of use quota IDs is increased, a communication available speed 3 MB/S is divided among the use quotas. The control module 202 notifies (replies to) the use application (1) 205 and the use application (3) 205 of "available" and a communication available speed 1.5 MB/S in a high-speed main body communication availability response, and newly sets a package name of the use application (3) 205 (com.test.testapp3) to the use application package name. This shifts the use state to the state 3. Next, in the state 3, having received the notification for requesting determination of high-speed main body communication availability from the use application (2) 205, the control module 202 adds a record as a new use quota to the use quota management table 204*a*. Here, the number of use quotas is increased, and thus a communication available speed is divided among the use quotas. The control module 202 notifies (replies to) the use application (1) 205, the use application (3) 205, and the use application (2) 205 of "available" and a communication available speed 1 MB/S in a high-speed main body communication availability response, and sets a package name of the use application (2) 205 (com.test.testapp2) to the use application package name. This shifts the used state to the state 4. As described above, in the embodiment, the control module adjusts a speed at which the applications perform communication, whereby a load on the CPU can be adjusted. Therefore, when a small number of applications use high-speed communication, higher speed communication is possible. Even when a large number of applications use high-speed communication, the resources can be utilized to the maximum.

Figure 9:
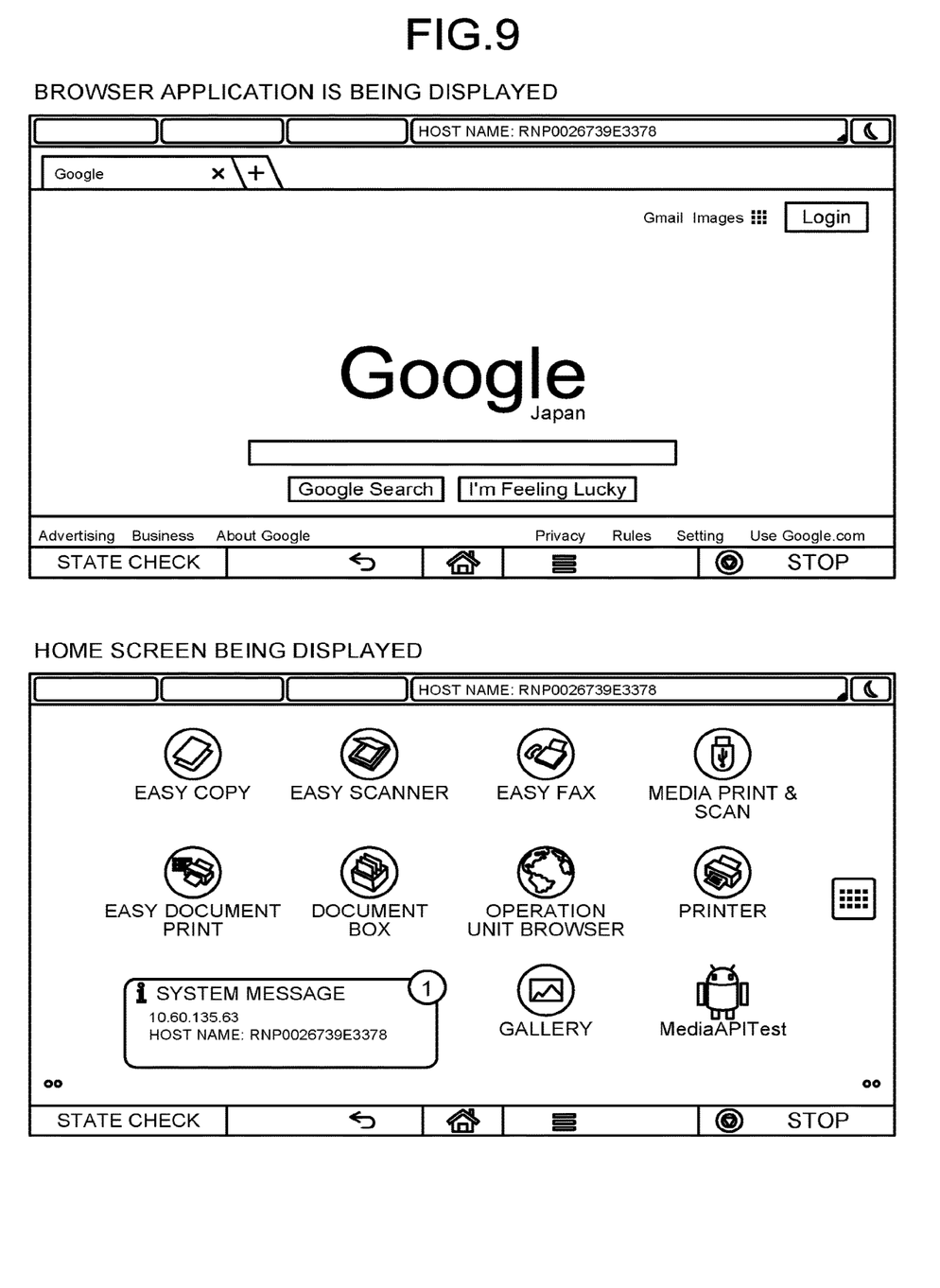
FIG. 9 is a diagram illustrating an application display screen.

FIG. 9 is a diagram illustrating an application display screen. A browser application transmits a notification for requesting determination of high-speed main body communication availability (use type: foreground) to the control module 202. When the browser application is being displayed, the control module 202 confirms a use application actually displayed and operating in a foreground, and replies (returns) "available" in a high-speed main body communication availability response because the blower application is operating in the foreground. When a home screen is being displayed, the control module 202 confirms a use application actually displayed and operating in a foreground, and returns "not available" in a high-speed main body communication availability response because the browser application is not operating in the foreground (, which is an active state where among a plurality of displayed application windows, an application is displayed on the front and can be operated by a user. The opposite state is referred to as a background). In the embodiment, an application of higher priority can preferentially use high-speed communication.

In the above, the embodiment of the present invention has been described. The control module gives an application a right to perform large capacity communication through the USB so as to manage the right, and restricts the number of applications performing large capacity communication at the same time. Thus, when an operation device performing communication with a device main body uses communication through the USB, it is possible to suppress a CPU using rate and prevent influence on the device main body.

In the present invention, an operation device performing communication with a device main body can suppress a CPU using rate and prevent influence on operation of the device main body when an application of the operation device performs communication with the device main body using a communication channel.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An operation device connected to a device main body through a communication channel to operate the device main body, the operation device comprising:
a universal serial bus (USB) interface configured to provide the communication channel; and
processing circuitry configured to control usage of the communication channel used by a plurality of applications stored on the operation device, wherein
when a first application of the plurality of applications requests to perform communication through the communication channel, when the first application is not currently using the communication channel, the processing circuitry determines whether the communication channel is available or not available to the first application based on a combined communication speed of any applications which are currently using the communication channel, and notifies the first application of a determination result, wherein the first application proceeds to utilize the communication channel or not utilize the communication channel based on the determination result.

2. The operation device according to claim 1, wherein, when notifying the first application of the determination result indicating that the first application may proceed to utilize the communication channel, the processing circuitry transmits a communication available speed to the first application.

3. The operation device according to claim 1, wherein the processing circuitry sets priority of the first application when the first application is determined to be allowed to utilize the communication channel, wherein the processing circuitry is configured to allow an application of higher priority to use the communication channel preferentially under a condition that a different application having lower priority than a set priority is using the communication channel.

4. The operation device according to claim 1, wherein the processing circuitry is capable of changing a priority of the first application while the first application continues a use of the communication channel.

5. The operation device according to claim 1, wherein the processing circuitry is capable of preliminarily setting the number of applications to be allowed to perform communication through the communication channel.

6. The operation device according to claim 1, wherein the processing circuitry is configured to obtain a using rate of the operation device, wherein
the processing circuitry changes the number of applications to be allowed to perform communication, based on the using rate of the operation device.

7. The operation device according to claim 1, wherein the processing circuitry is capable of changing a communication available speed depending on the number of applications performing communication through the communication channel.

8. The operation device according to claim 1, wherein the processing circuitry confirms an execution state of the first application, and gives the first application a use right with priority determined in accordance with the execution state.

9. A method for managing a use right of a communication channel performed by an operation device connected to a device main body through the communication channel via a universal serial bus (USB) interface, the method comprising:
controlling, by processing circuitry of the operation device, usage of the communication channel used by a plurality of applications stored on the operation device, wherein
when a first application of the plurality of applications requests to perform communication through the communication channel, when the first application is not currently using the communication channel, the processing circuitry determines whether the communication channel is available or not available to the first application based on a combined communication speed of any applications which are currently using the communication channel, and notifies the first application of a determination result,
wherein the first application proceeds to utilize the communication channel or not utilize the communication channel based on the determination result.

10. A non-transitory computer readable medium that stores a program, which when executed by an operation device, causes the operation device to perform a method for managing a use right of a communication channel, the operation device being connected to a device main body through the communication channel via a universal serial bus (USB) interface, the method comprising:
controlling, by processing circuitry of the operation device, usage of the communication channel used by a plurality of applications stored on the operation device, wherein
when a first application of the plurality of applications requests to perform communication through the communication channel, when the first application is not currently using the communication channel, the processing circuitry determines whether the communication channel is available or not available to the first application based on a combined communication speed of any applications which are currently using the communication channel, and notifies the first application of a determination result,
wherein the first application proceeds to utilize the communication channel or not utilize the communication channel based on the determination result.

* * * * *